US012469497B2

(12) United States Patent
Keret et al.

(10) Patent No.: US 12,469,497 B2
(45) Date of Patent: Nov. 11, 2025

(54) COMPUTERIZED-METHOD AND COMPUTERIZED-SYSTEM FOR TRAINING AND APPLYING A MACHINE LEARNING (ML) TEXTUAL BEHAVIORAL IDENTIFICATION MODEL TO AUTHENTICATE AN AGENT, IN A DIGITAL MULTI-CHANNEL ENVIRONMENT

(71) Applicant: NICE LTD., Ra'anana (IL)

(72) Inventors: Matan Keret, Oulu (FI); Rahul Vyas, Jodhpur Rajasthan (IN); Salil Dhawan, Pune (IN); Or Gershon, Rosh Haayin (IL)

(73) Assignee: NICE LTD., Ra'anana (IL)

( * ) Notice: Subject to any disclaimer, the term of this patent is extended or adjusted under 35 U.S.C. 154(b) by 567 days.

(21) Appl. No.: 18/084,573

(22) Filed: Dec. 20, 2022

(65) Prior Publication Data

US 2024/0203424 A1    Jun. 20, 2024

(51) Int. Cl.
*G10L 17/04* (2013.01)
*G06F 21/32* (2013.01)
*G10L 17/22* (2013.01)

(52) U.S. Cl.
CPC .............. *G10L 17/04* (2013.01); *G06F 21/32* (2013.01); *G10L 17/22* (2013.01)

(58) Field of Classification Search
CPC ........... G06F 21/31; G06F 21/45; G10L 17/04
USPC ........................................................ 704/246
See application file for complete search history.

(56) References Cited

U.S. PATENT DOCUMENTS

| 9,460,711 | B1 * | 10/2016 | Vanhoucke | G10L 15/16 |
| 12,327,564 | B1 * | 6/2025 | Tan | G10L 17/04 |
| 2017/0039274 | A1 * | 2/2017 | Kaleta | G06F 40/30 |
| 2018/0349347 | A1 * | 12/2018 | Ringger | G06Q 30/0251 |
| 2020/0175961 | A1 * | 6/2020 | Thomson | G10L 15/063 |

(Continued)

FOREIGN PATENT DOCUMENTS

WO    WO-2021108163 A1 *    6/2021    ......... G10L 15/1815

*Primary Examiner* — Richemond Dorvil
*Assistant Examiner* — Rodrigo A Chavez
(74) *Attorney, Agent, or Firm* — SOROKER AGMON NORDMAN RIBA

(57) ABSTRACT

A computerized-method for training and applying a Machine Learning (ML) textual behavioral-identification-model to authenticate an agent, in a digital multi-channel environment, is provided herein. The computerized-method may include: (i) training a ML-textual-behavioral-identification-model using retrieved textual responses of each agent in one or more historical-interactions which were conducted in a controlled environment, as a training dataset. The ML-textual-behavioral-identification-model may be configured to process the retrieved textual responses of each agent to generate a profile-identity-data for each agent to be used to authenticate identity of the agent; (ii) receiving a textual-response of each agent, when the agent starts an interaction with a customer; (iii) applying the textual-response of the agent to the ML-textual-behavioral-identification-module to authenticate an identity of the agent in real-time by calculating an imposter-probability score for the agent and; (iv) sending the imposter-probability score to a file-management-system to take one or more actions when the imposter-probability score is above a preconfigured-threshold.

14 Claims, 12 Drawing Sheets

(56) References Cited

U.S. PATENT DOCUMENTS

Figure 1A:
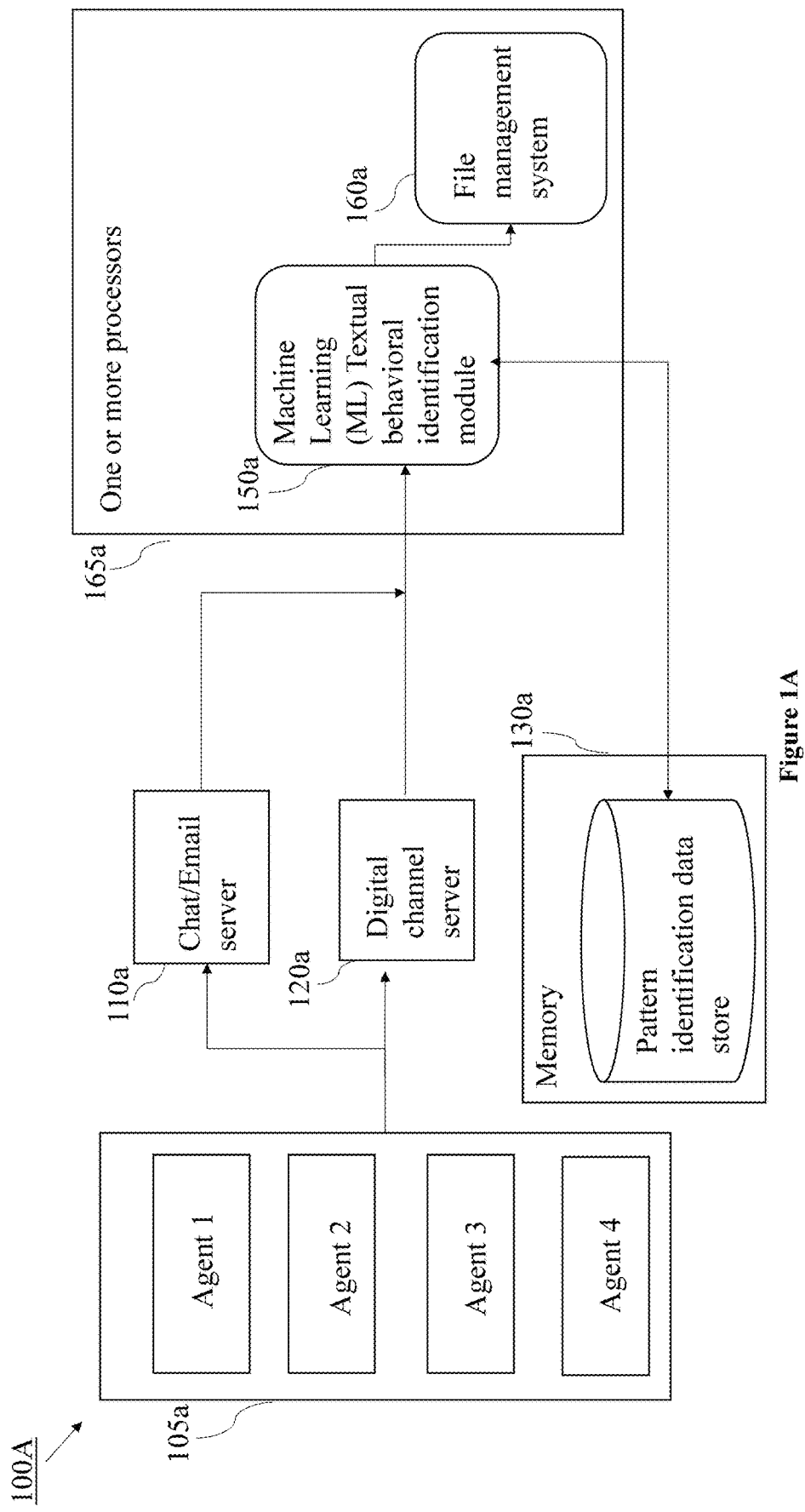

| | | | | |
|---|---|---|---|---|
| 2020/0366671 | A1* | 11/2020 | Larson | G06F 9/451 |
| 2020/0374251 | A1* | 11/2020 | Warshaw | H04L 51/56 |
| 2021/0375291 | A1* | 12/2021 | Zeng | H04L 67/306 |
| 2024/0086501 | A1* | 3/2024 | Osborn | G06F 21/31 |
| 2024/0144935 | A1* | 5/2024 | Martin | G10L 17/02 |
| 2024/0363099 | A1* | 10/2024 | Altaf | G10L 15/02 |

* cited by examiner

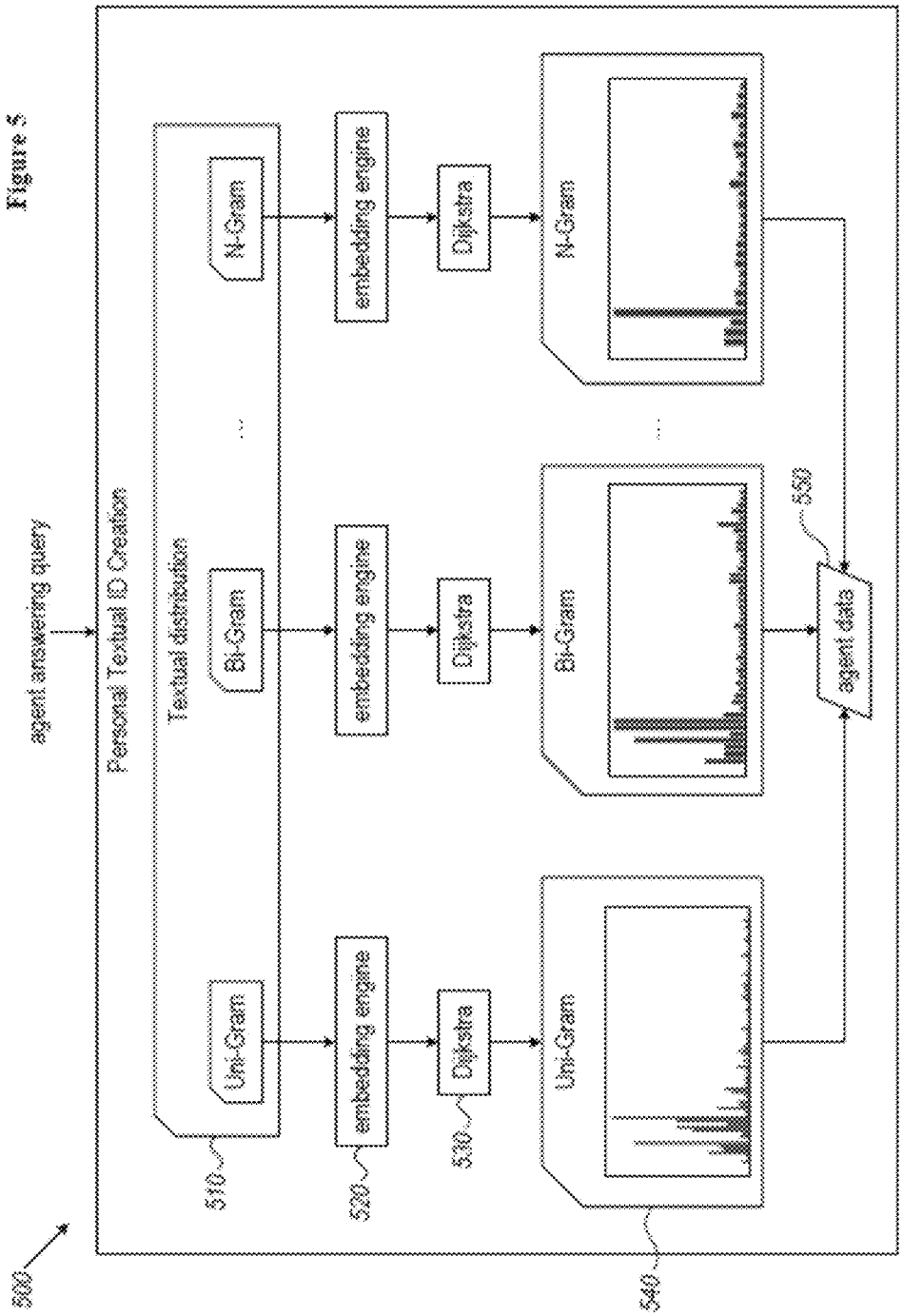

Figure 6A

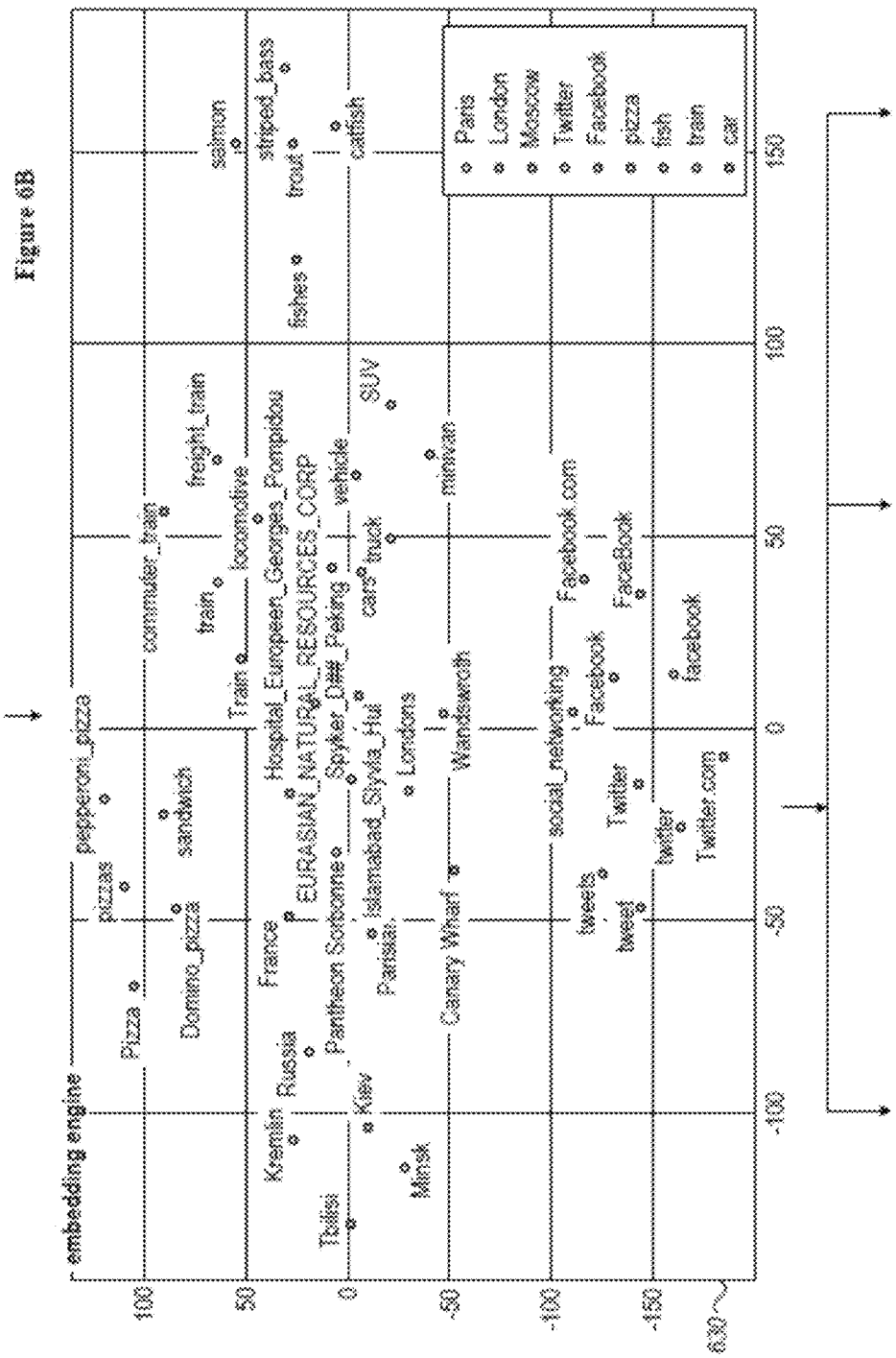

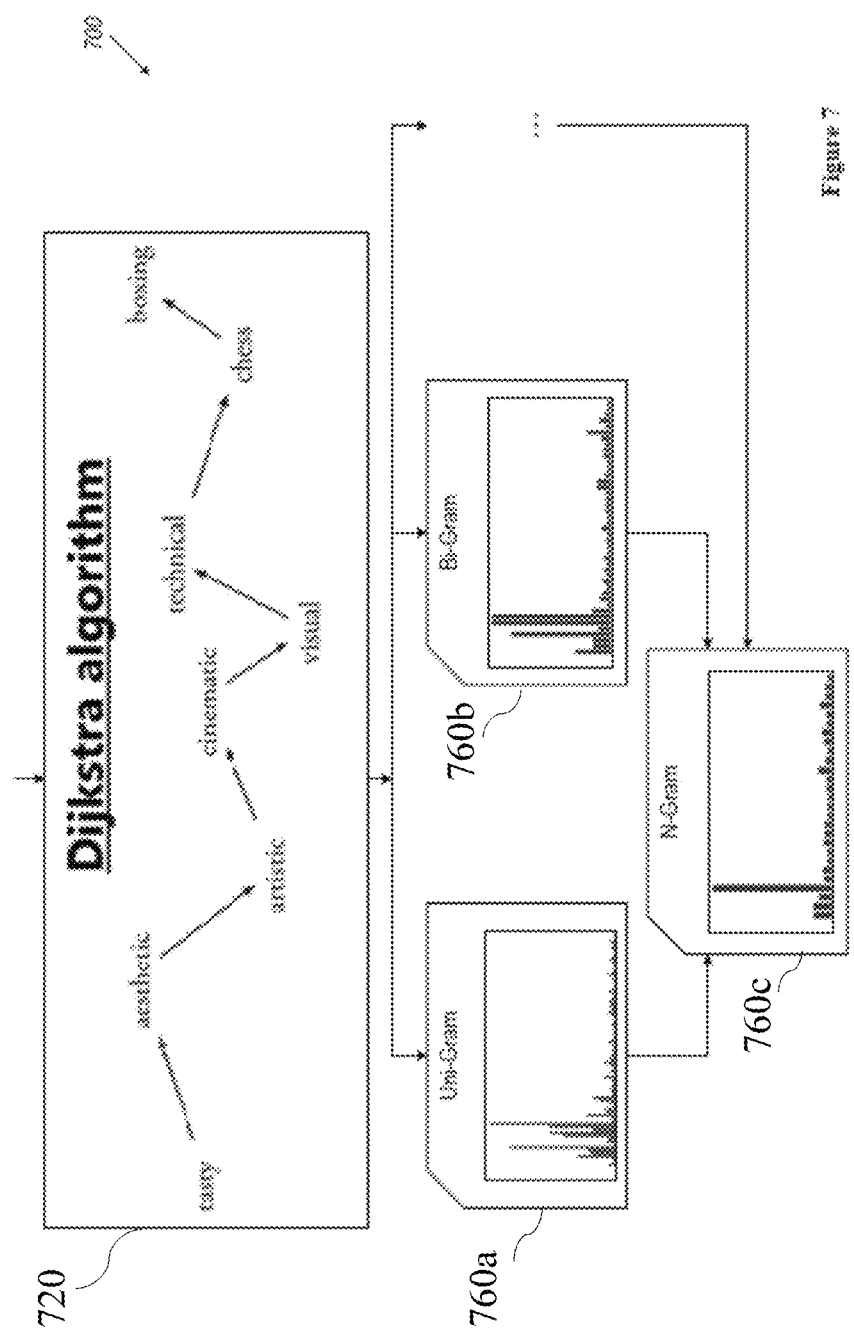

COMPUTERIZED-METHOD AND COMPUTERIZED-SYSTEM FOR TRAINING AND APPLYING A MACHINE LEARNING (ML) TEXTUAL BEHAVIORAL IDENTIFICATION MODEL TO AUTHENTICATE AN AGENT, IN A DIGITAL MULTI-CHANNEL ENVIRONMENT

TECHNICAL FIELD

The present disclosure relates to the field of Machine Learning (ML) model training and application thereof. More specifically, the present disclosure relates to farming training data related to historical interaction text, to be used for ML model training to authenticate an agent in a digital multi-channel environment.

BACKGROUND

In a hybrid work environment, which includes working from the office, as well as Work From Home (WFH) environment, there may be situations where an agent is having someone else, i.e., an imposter, to perform assignments scheduled for the agent instead of the agents themselves. When the agent is having someone else on a frequent basis, then it may harm the agent professional growth and also it may be illegal.

Accordingly, there is a need for a technical solution in a digital multi-channel contact center, that will identify that the agent that is assigned to the schedule is the agent that provides service to the customer and not an unauthorized person, i.e., an imposter.

Machine Learning (ML) models are designed to learn from data. An ML model can be built based on historical data related to the agents and be configured to perform functions based on received input to it. Accordingly, there is a need for a system and method for training and applying an ML model to authenticate an agent in a digital multi-channel environment, such as a contact center.

SUMMARY

There is thus provided, in accordance with some embodiments of the present disclosure, a computerized-method for training and applying a Machine Learning (ML) textual behavioral identification model to authenticate an agent, in a digital multi-channel environment.

In accordance with some embodiments of the present disclosure, the computerized-method may include: (i) training an ML textual behavioral identification model using retrieved textual responses of each agent in one or more historical interactions which were conducted in a controlled environment, as a training dataset. The ML textual behavioral identification model may be configured to process the retrieved textual responses of each agent in one or more historical interactions which were conducted in a controlled environment to generate a profile-identity-data for each agent to be used to authenticate identity of the agent; The profile-identity-data for each agent may be stored in a pattern-identification data store. (ii) receiving a textual response of each agent, when the agent starts an interaction with a customer; (iii) applying the textual response of the agent to the ML textual behavioral identification module to authenticate an identity of the agent in real-time by calculating an imposter-probability score for the agent, based on the received textual response and the generated profile-identity-data of the agent. The imposter-probability score indicates a probability that the agent is an imposter; (iv) sending the imposter-probability score to a file management system to take one or more actions when the imposter-probability score is above a preconfigured threshold.

Furthermore, in accordance with some embodiments of the present disclosure, the process of the retrieved textual responses of each agent in one or more historical interactions which were conducted in a controlled environment may include: (i) creating a set of textual units. The set of textual units is comprised of vocabulary elements, and each vocabulary element of the vocabulary elements may be an n-gram unit which is a contiguous sequence of '1' through 'n' vocabulary elements from the received textual response; (ii) finding a distribution of each n-gram; (iii) embedding each vocabulary element using Natural Language Processing (NLP) embedding engine to output a unique vector representation; (iv) arranging each n-gram graph distribution of '1' through 'n' n-gram distributions; and (v) using the unique vector representation to create a continues similarity between the textual elements.

Furthermore, in accordance with some embodiments of the present disclosure, a controlled environment may be an environment that the identity of the agent may be verified. For example, an office environment may be an environment where the identity of the agent may be verified.

Furthermore, in accordance with some embodiments of the present disclosure, the one or more historical interactions have been conducted via digital text-based channels or voice channels.

Furthermore, in accordance with some embodiments of the present disclosure, the retrieved textual responses may be text of text-based interactions or transcripts of voice interactions.

Furthermore, in accordance with some embodiments of the present disclosure, text-based interactions may be processed by at least one of: (i) chat or email server; and (ii) digital channel server.

Furthermore, in accordance with some embodiments of the present disclosure, the one or more actions may be selected from at least one of: (i) prompting the agent to authenticate; (ii) blocking the agent from handling further interactions; (iii) sending a report or alerts to a supervisor as to the agent imposter-probability score.

Furthermore, in accordance with some embodiments of the present disclosure, the prompted authentication may be an application for authentication.

Furthermore, in accordance with some embodiments of the present disclosure, the prompted authentication may be voice-biometric.

Furthermore, in accordance with some embodiments of the present disclosure, the arranging of the n-gram distribution is operated by Dijkstra algorithm using Euclidian distance.

Furthermore, in accordance with some embodiments of the present disclosure, the imposter-probability score may be calculated by: (i) processing the received textual response to a set of textual units, the set of textual units is comprised of vocabulary elements, each vocabulary element of the vocabulary elements is an n-gram unit which is a contiguous sequence of '1' through 'n' vocabulary elements from the received textual response; (ii) finding a distribution of each n-gram; (iii) embedding each vocabulary element by using Natural Language Processing (NLP) embedding engine to output a unique vector representation (iv) arranging each n-gram distribution graph of the '1' through 'n' n-gram distributions; (v) using the unique vector representation to create a continues similarity between the textual elements;

and (vi) calculating an average distance between each vector of the unique vector representation of the profile-identity-data, and each vector of the unique vector representation of the received textual response to yield an imposter-probability score.

Furthermore, in accordance with some embodiments of the present disclosure, the calculating of the average distance may be operated by an Earth Movers Distance (EMD) algorithm.

Furthermore, in accordance with some embodiments of the present disclosure, when the imposter-probability score is below a preconfigured threshold it may indicate that the agent is authenticated and the received textual response may be used for retraining or enriching the ML textual behavioral identification module.

Furthermore, in accordance with some embodiments of the present disclosure, every preconfigured time the ML textual behavioral identification model may be retrained or enriched by a textual response of each agent during an interaction which has been conducted in a controlled environment, after the agent has been authenticated during the interaction by an authentication application.

There is further provided, in accordance with some embodiments of the present invention, a computerized-system for training and applying a Machine Learning (ML) textual behavioral identification model to authenticate an agent, in a digital multi-channel environment.

Furthermore, in accordance with some embodiments of the present disclosure, the computerized-system may include one or more processors, and a pattern identification data store. The one or more processors may be configured to train an ML textual behavioral identification model using retrieved textual responses of each agent in one or more historical interactions which were conducted in a controlled environment, as a training dataset. The ML textual behavioral identification model may be configured to process the retrieved textual responses of each agent in one or more historical interactions which were conducted in a controlled environment to generate a profile-identity-data for each agent to be used to authenticate the identity of the agent. The profile-identity-data may be stored in the pattern identification data store. The one or more processors may be configured to receive a textual response of each agent when the agent starts an interaction with a customer and forward the textual response to the ML textual behavioral identification module. The ML textual behavioral identification module may be configured to apply the textual response of the agent to authenticate the identity of an agent in real-time by calculating an imposter-probability score for the agent, based on the received textual response and the generated profile-identity-data of the agent that is stored in the pattern-identification data store, and forward the imposter-probability score to a file management system. The imposter-probability score may indicate a probability that the agent is an imposter. One or more processors in the file management system may be configured to take one or more actions when the imposter-probability score is above a preconfigured threshold.

Furthermore, in accordance with some embodiments of the present disclosure, the file management system may be further configured to detect aged training data of an agent for disposal and communicate with the ML textual behavioral identification module to retrain based on recent data of the agent.

BRIEF DESCRIPTION OF THE DRA WINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

Figure 1B:
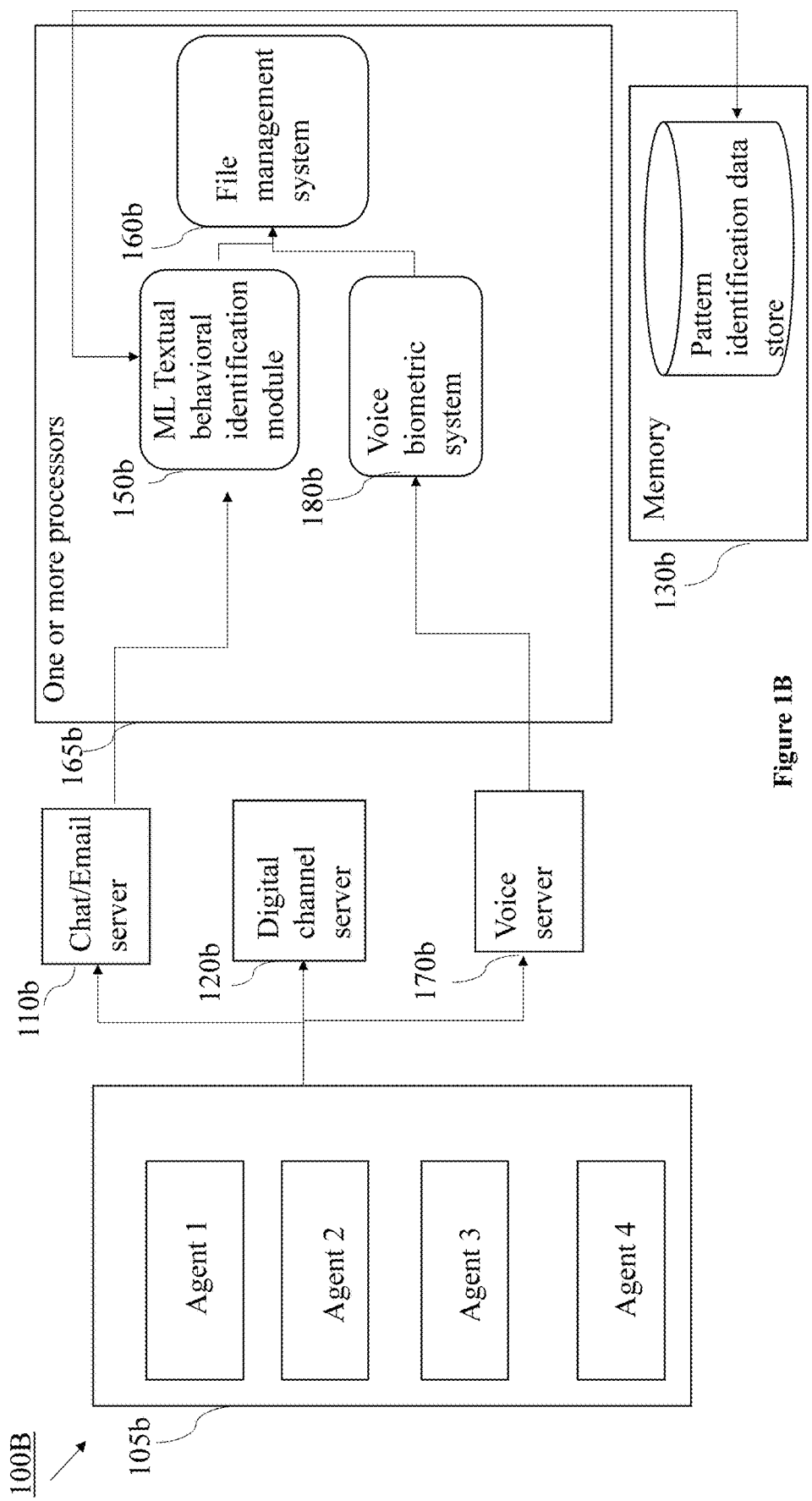
Figure 2:
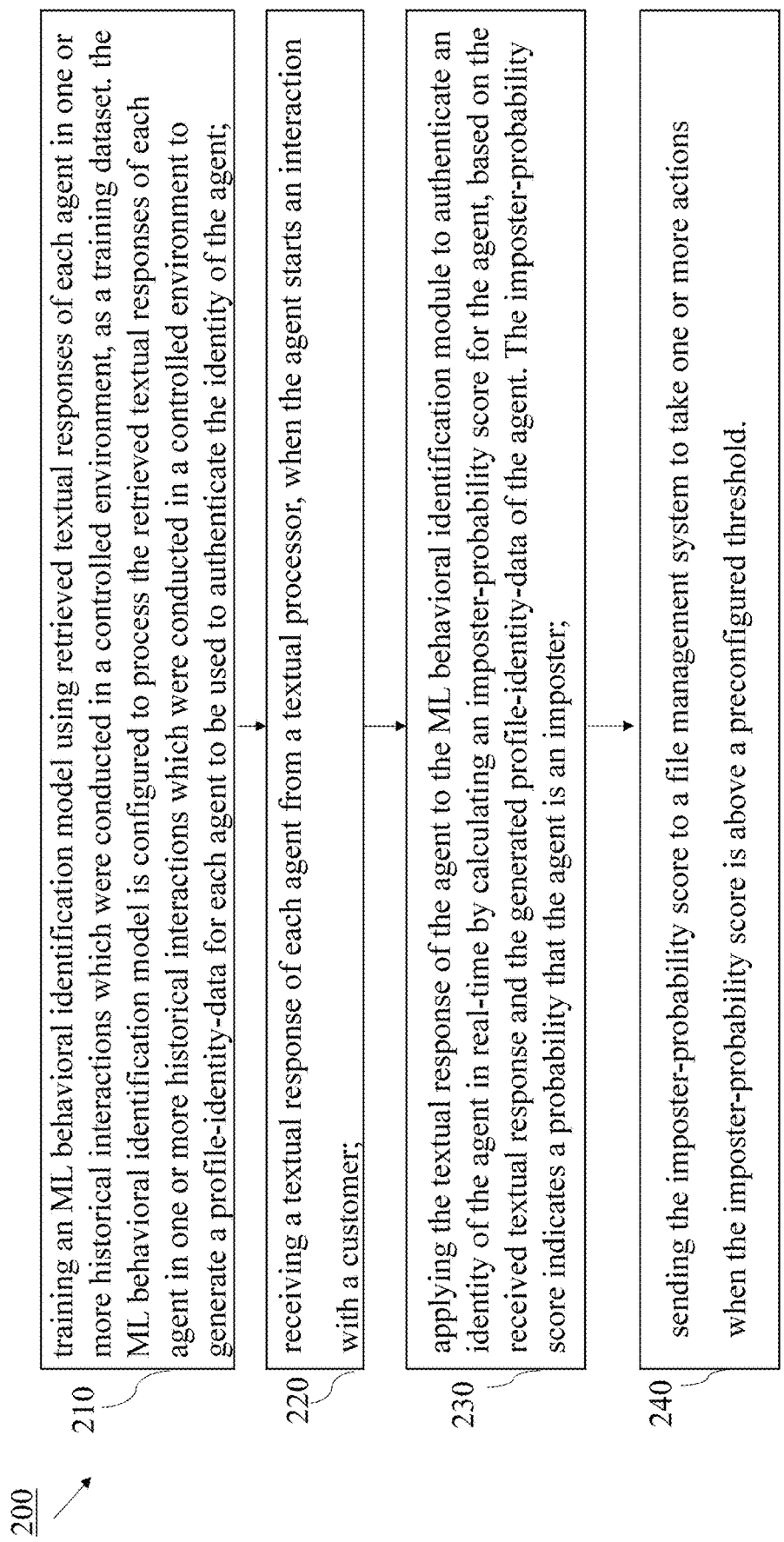
Figure 3:
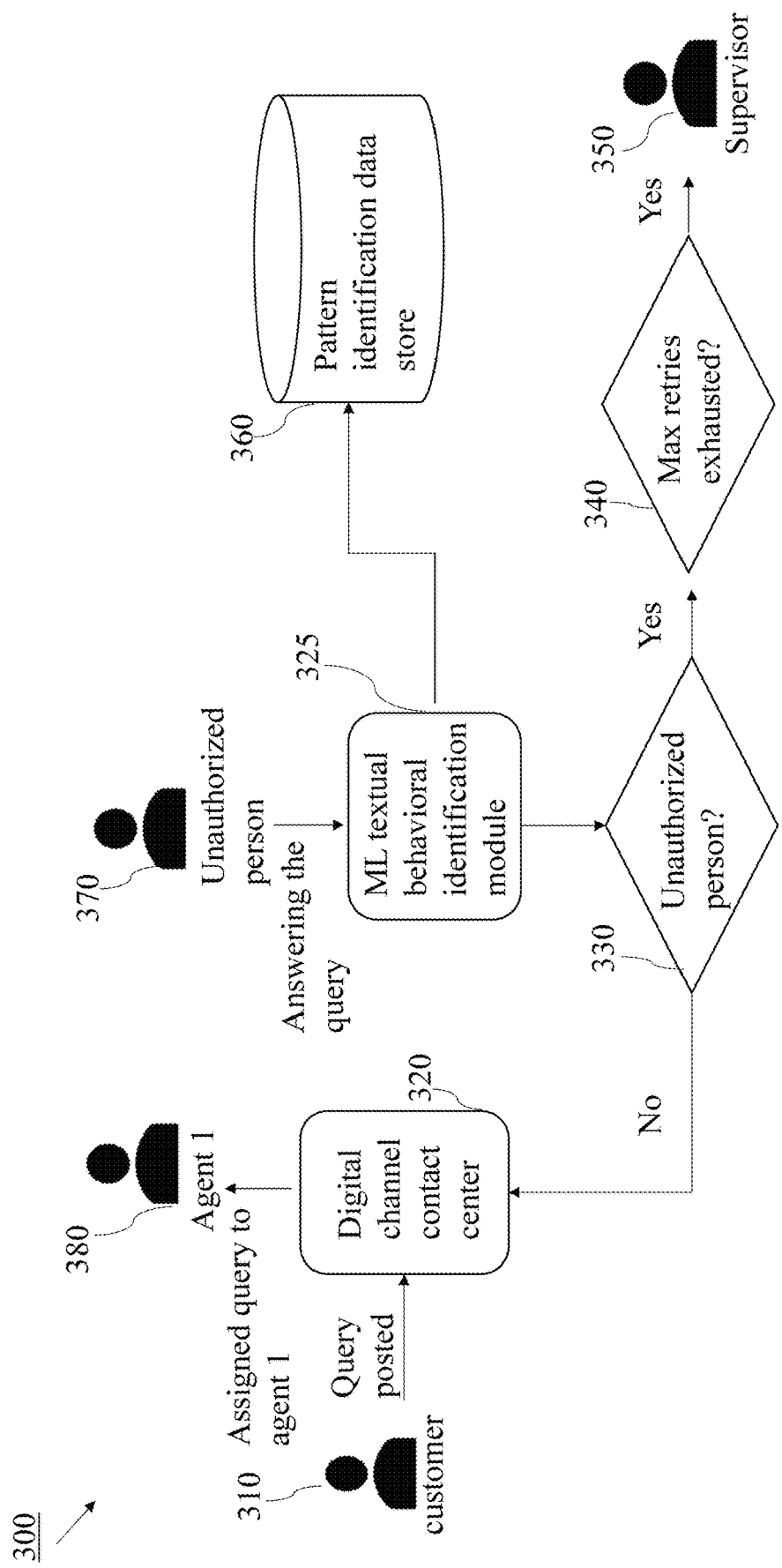
Figure 4:
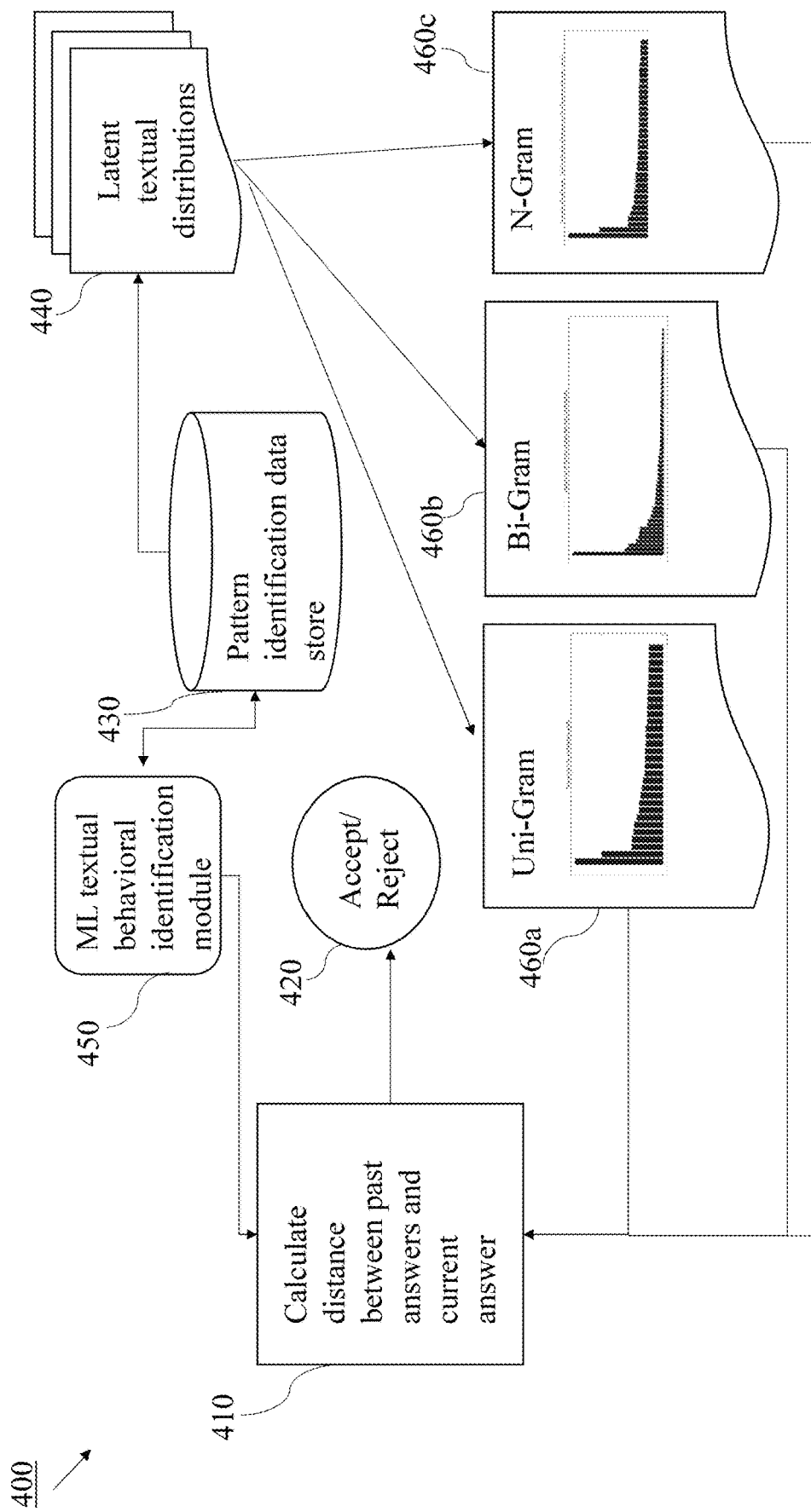
Figure 6A:
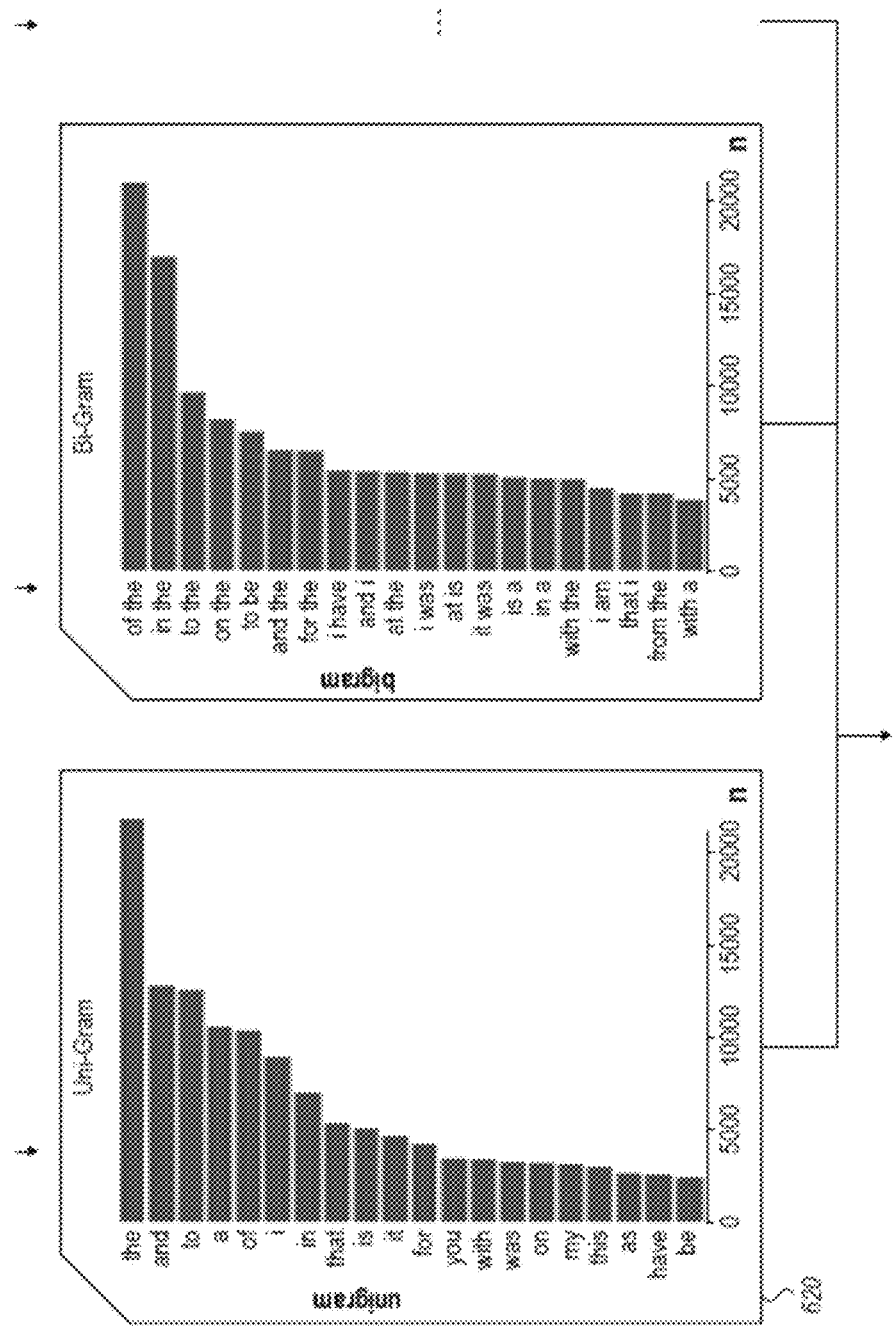
Figure 6B:
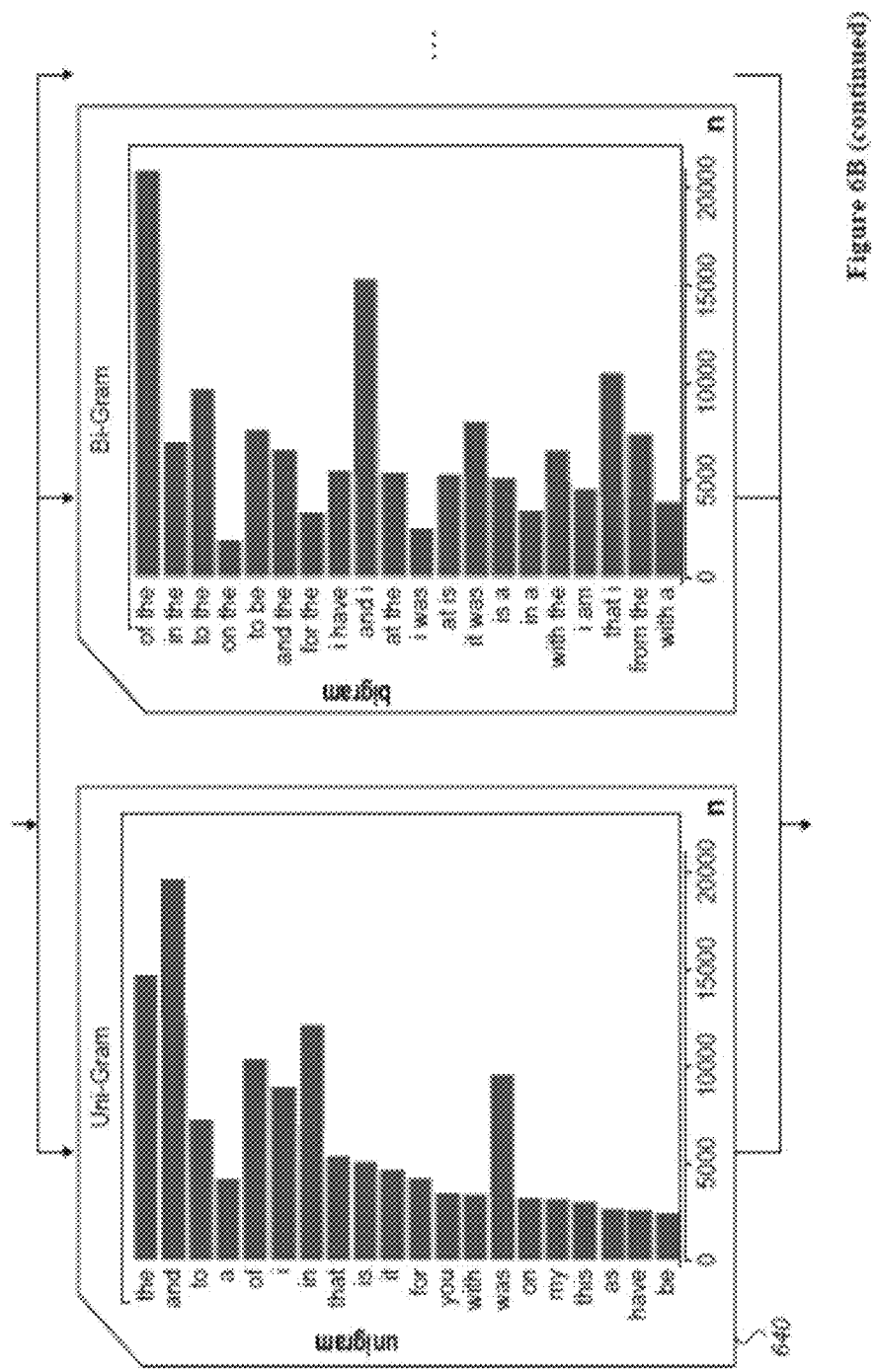
Figure 8:
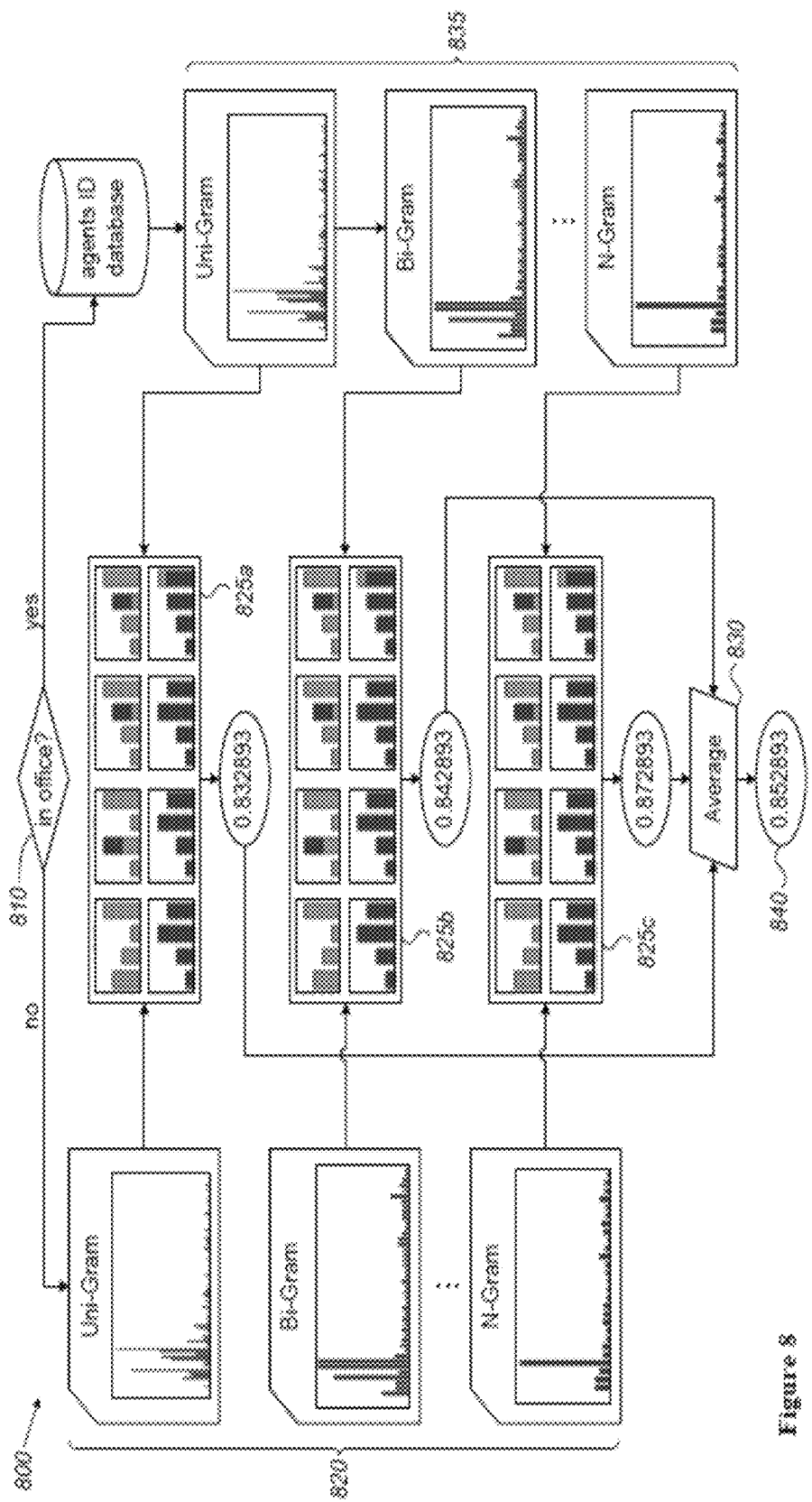

FIGS. 1A-1B schematically illustrates a high-level diagram of a computerized-system for training and applying a Machine Learning (ML) textual behavioral identification model to authenticate an agent, in a digital multi-channel environment, in accordance with some embodiments of the present invention;

FIG. 2 schematically illustrates a high-level diagram of a computerized-method for training and applying a Machine Learning (ML) textual behavioral identification model to authenticate an agent, in a digital multi-channel environment, in accordance with some embodiments of the present invention;

FIG. 3 schematically illustrates a high-level diagram of a computerized-system for utilizing an ML textual behavioral identification model, in a contact center, in accordance with some embodiments of the present invention;

FIG. 4 schematically illustrates a high-level workflow of agent authentication, in accordance with some embodiments of the present invention;

FIG. 5 schematically illustrates a high-level workflow of personal textual ID creation, in accordance with some embodiments of the present invention;

FIGS. 6A-6B schematically illustrate simulations of agent authentication, in accordance with some embodiments of the present invention;

FIG. 7 schematically illustrates a simulation of Dijkstra algorithm, in accordance with some embodiments of the present invention; and FIG. 8 is a workflow of Earth Movers Distance (EMD), in accordance with some embodiments of the present invention.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence.

Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In a Work-From-Home (WFH) environment there may be cases where the agent is not performing the work, but instead having someone else taking the shifts or the scheduled tasks. However, when the agent swaps a shift in the contact center with someone else on a frequent basis, it is not good for the agent professional growth, and it may be also illegal.

Hence, there is a need for a technical solution in a digital multi-channel contact center, to identify or authenticate the agent identity, i.e., authenticate that the real agent that is having an employment contract with the contact center, is the agent that is working.

The term "vocabular element" as used herein refers to textual elements, such as words.

FIG. 1A schematically illustrates a high-level diagram of a computerized-system 100A for training and applying a Machine Learning (ML) textual behavioral identification model to authenticate an agent, in a digital multi-channel environment, in accordance with some embodiments of the present invention.

According to some embodiments of the present disclosure, system 100A may train a Machine Learning (ML) model, such as ML Textual behavioral identification module 150a by using textual responses of agents to create an ML textual behavioral identification module 150a. The trained module may be stored in a database and may be used to authenticate an agent, such as 'agent 1', 'agent 2', 'agent 3' and 'agent 4' 105a, in real-time or offline for textual interactions, or voice interactions' transcripts.

According to some embodiments of the present disclosure, the text of the textual interactions or transcripts of the voice interactions may be stored in data structures, such as strings or an array of strings that may be fed into the classification flow of the ML module, such as ML textual behavioral identification module 150a.

According to some embodiments of the present disclosure, system 100A may identify patterns of textual replies of agents 105a during their interactions, e.g., with customers. The patterns of textual replies may be a way that the agents reply to a query. Each agent may have one or more patterns of textual replies, for example, as shown in FIG. 6A.

According to some embodiments of the present disclosure, one or more processors 165a may be configured to train a ML model, such as ML textual behavioral identification model 150a, by using a training dataset. The training dataset may include textual responses of each agent during one or more historical interactions which have been conducted in a controlled environment. The controlled environment may be an environment where the agent may be verified, such as the office.

According to some embodiments of the present disclosure, the textual responses may be retrieved from a data store (not shown). For example, a data store that stores historical interactions for compliance or quality management purposes.

According to some embodiments of the present disclosure, the ML textual behavioral identification model 150a may be configured to process the retrieved textual responses of each agent in one or more historical interactions which were conducted in a controlled environment to generate a profile-identity-data for each agent to be used to authenticate the agent. The profile-identity-data may be stored in a data store, such as pattern identification data store 130a.

According to some embodiments of the present disclosure, the ML textual behavioral identification module 150a may be configured to apply the textual response of the agent to authenticate the agent in real-time or optionally in a batch process once in a preconfigured time, by calculating an imposter-probability score for the agent, based on the received textual response and the generated profile-identity-data of the agent, and forward the imposter-probability score to a system, such as file management system 160a. The calculation of the imposter-probability score may be for the agent for the specific interaction.

According to some embodiments of the present disclosure, the imposter-probability score may indicate a probability that the agent is an imposter.

According to some embodiments of the present disclosure, the file management system 160a may be configured to take one or more actions when the imposter-probability score is above a preconfigured threshold.

According to some embodiments of the present disclosure, the one or more actions may be for example, prompting the agent to a further authentication process by using an authentication application, such as voice-biometrics or any other method. In another example, the action may be blocking the agent from providing service to customers when the agent received an imposter-probability score above a preconfigured threshold, for a preconfigured amount of time or attempts to authenticate. In yet another example, the action may be reporting to a supervisor as to the imposter-probability score.

According to some embodiments of the present disclosure, the imposter-probability scores may be a numeric value that may be held in a data structure, such as a dictionary. Alternatively, the imposter-probability scores may be stored as a List, as JavaScript Object Notation (JSON) structures or similar.

According to some embodiments of the present disclosure, interaction metadata may be stored as a complex object. The complex object may hold lists of information, such as different business data strings. Interaction metadata may be a set of metadata, for example, interaction ID, local start time, local stop time, GMT start time, GMT stop time, interaction duration, open reason, close reason, switch ID, user ID, interaction type, media type, dialed number (ANI), participants, contact ID, contact start time, call ID etc. Agent metadata may be stored as a complex object. Example for agent metadata: ID, tenant ID, CRM reference, gender ID, first name, last name, address, birth date, seniority, nationality, state of origin, OS login etc.

According to some embodiments of the present disclosure, the process of the retrieved textual responses of each agent in one or more historical interactions which were conducted in a controlled environment may include creating a set of textual units. The set of textual units may include vocabulary elements. Each vocabulary element may be an n-gram unit which is a contiguous sequence of '1' through 'n' vocabulary elements from the received textual response. Then, a graph distribution for each n-gram, may be created, as shown in FIG. 4.

According to some embodiments of the present disclosure, each vocabulary element may be embedded using Natural Language Processing (NLP) embedding engine, for example, as shown in FIG. 6B, to output a unique vector representation.

According to some embodiments of the present disclosure, the process of the retrieved textual responses of each agent in one or more historical interactions may further include arranging each n-gram graph distribution of '1' through 'n' n-gram distributions, such that similar vocabulary elements are close. Then, using the unique vector representation to create a continues similarity between the textual elements.

According to some embodiments of the present disclosure, a controlled environment may be an environment where an agent is verified, such as the office or any other place where an agent that has an employment contract with the contact center can be verified.

According to some embodiments of the present disclosure, the one or more historical interactions of each agent may have been conducted via digital text-based channels or voice channels.

According to some embodiments of the present disclosure, the retrieved textual responses may be text of text-based interactions or transcripts of voice interactions.

According to some embodiments of the present disclosure, text-based interactions may be processed by a chat or email server 110a or a digital channel server 120a. Commonly, email servers use Simple Mail Transfer Protocol (SMTP) protocol and chat, or digital servers may use XMPP or any webserver protocol.

According to some embodiments of the present disclosure, after an imposter-probability score has been calculated for the agent, the imposter-probability score is above a preconfigured threshold, which may indicate a probability that the agent is an imposter, a system, such as file management system 160a may prompt the agent to authenticate by an authentication application, such as voice-biometrics.

According to some embodiments of the present disclosure, after an imposter-probability score has been calculated for the agent, which may indicate a probability that the agent is an imposter, and the imposter-probability score is above a preconfigured threshold, a system, such as file management system 160a may block the agent from interacting with customers. For example, the agent may be blocked after a preconfigured number of attempts, i.e., times that the calculated imposter-probability score has been above a preconfigured threshold.

According to some embodiments of the present disclosure, when the imposter-probability score may be below a preconfigured threshold, the received textual response may be used for retraining of the ML textual behavioral identification module 150a.

According to some embodiments of the present disclosure, the imposter-probability score may be calculated by processing the received textual response, such as response 610, in FIG. 6A to a set of textual units. The set of textual units may include vocabulary elements. Each vocabulary element is an n-gram unit which is a contiguous sequence of '1' through 'n' vocabulary elements from the received textual response. Then, a distribution of each n-gram may be found, as shown by elements 460a-460c, in FIG. 4, in FIG. 5 and by element 620.

According to some embodiments of the present disclosure, the imposter-probability score may be further calculated by embedding each vocabulary element by using Natural Language Processing (NLP) embedding engine to output a unique vector representation, as shown in FIG. 6B then, arranging each n-gram distribution graph of the '1' through 'n' n-gram distributions and then, using the unique vector representation to create a continues similarity, as shown in FIG. 7, between the textual elements. For example, a continues similarity may be created by a Dijkstra's algorithm.

According to some embodiments of the present disclosure, Dijkstra's algorithm is an algorithm for finding the shortest paths between nodes in a graph, e.g., the embeddings. The Dijkstra's algorithm may be used to sort the embeddings in a way that what they represent will be in a continues meaning.

According to some embodiments of the present disclosure, in information retrieval and text mining, each word is assigned a different coordinate and a document is represented by the vector of the numbers of occurrences of each word in the document. The continues similarity may provide a useful measure of how similar two documents are likely to be, in terms of their subject matter, and independently of the length of the documents.

According to some embodiments of the present disclosure, each textual element may be represented by an embedding vector e.g., coordinate, in a way that similar textual elements are closer than the non-similar ones, as shown in FIG. 7 for word as textual elements, and each embedding may be represented by its textual representation: Tasty->aesthetic->artistic->cinematic->visual->technical->chess->boxing.

According to some embodiments of the present disclosure, an imposter-probability score may be yielded by a calculation of an average distance between each vector of the unique vector representation of the profile-identity-data, and each vector of the unique vector representation of the received textual response.

According to some embodiments of the present disclosure, the calculating of the average distance between each vector of the unique vector representation of the profile-identity-data, and each vector of the unique vector representation of the received textual response to yield an imposter-probability score may be operated by an Earth Movers Distance (EMD) algorithm.

According to some embodiments of the present disclosure, when the imposter-probability score is below a preconfigured threshold it may indicate that the agent is authenticated and the received textual response may be used for retraining or enriching the ML textual behavioral identification module 150a.

According to some embodiments of the present disclosure, the file management system 160a may be further configured to detect aged training data of an agent for disposal and communicate with the ML textual behavioral identification module 150a to retrain based on recent data of the agent.

FIG. 1B schematically illustrates a high-level diagram of a computerized-system 100B for training and applying a Machine Learning (ML) textual behavioral identification model to authenticate an agent, in a digital multi-channel environment, in accordance with some embodiments of the present invention.

According to some embodiments of the present disclosure, system 100B may include all the components of system 100a in FIG. 1A.

According to some embodiments of the present disclosure, an authentication by a system, such as voice-biometric system 180b may be implemented by using a voice server 170b for voice interactions which have been conducted by agents 105b to create a voiceprint for each agent.

According to some embodiments of the present disclosure, a voiceprint of an interaction may be stored in a database and may be used to authenticate the agent in real-time or optionally, offline by the agent voice. Several samples from several calls, i.e., voice interactions, may be collected for training and enrichment of the ML textual behavioral identification model 150a over time.

According to some embodiments of the present disclosure, every preconfigured time, the ML textual behavioral identification model 150a may be retrained or enriched by a textual response of each agent during an interaction which has been conducted in a controlled environment. One or more voice recorded segments may be forwarded from a server, such as voice server 170b to a voice biometric system 180b during the interaction, or after it the agent may be authenticated by an authentication application, such as voice biometric system 180b.

According to some embodiments of the present disclosure, the recordings of the voice interactions may be held in byte arrays, which may store binary data. The data may be used to generate voiceprints in voice biometric flows.

According to some embodiments of the present disclosure, system 100B may identify or authenticate the agent by the agent's textual behavioral i.e., textual responses and additionally by the agent voice-print which may be received from a voice biometric system 180b.

FIG. 2 schematically illustrates a high-level diagram of a computerized-method 200 for training and applying a Machine Learning (ML) textual behavioral identification model to authenticate an agent, in a digital multi-channel environment, in accordance with some embodiments of the present invention.

According to some embodiments of the present disclosure, operation 210 comprising training a ML textual behavioral identification model using retrieved textual responses of each agent in one or more historical interactions which were conducted in a controlled environment, as a training dataset. The ML textual behavioral identification model is configured to process the retrieved textual responses of each agent in one or more historical interactions which were conducted in a controlled environment to generate a profile-identity-data for each agent to be used to authenticate the identity of the agent.

According to some embodiments of the present disclosure, the profile-identity-data for each agent may be stored in a pattern-identification datastore, such as pattern-identification datastore 130a in FIG. 1A.

According to some embodiments of the present disclosure, operation 220 comprising receiving a textual response of each agent, when the agent starts an interaction with a customer.

According to some embodiments of the present disclosure, operation 230 comprising applying the textual response of the agent to the ML textual behavioral identification module to authenticate an identity of the agent in real-time by calculating an imposter-probability score for the agent, based on the received textual response and the generated profile-identity-data of the agent. The imposter-probability score may indicate a probability that the agent is an imposter.

According to some embodiments of the present disclosure, operation 240 comprising sending the imposter-probability score to a file management system to take one or more actions when the imposter-probability score is above a preconfigured threshold. The file management system may be a system such as file management system 160a in FIG. 1A, and optionally, such as file management system 160b in FIG. 1B.

FIG. 3 schematically illustrates a high-level diagram of a computerized-system 300 for utilizing an ML textual behavioral identification model, in a contact center, in accordance with some embodiments of the present invention.

According to some embodiments of the present disclosure, once a customer 310 contacts an organization, which has a system such as system 100 in FIG. 1A or system 100B in FIG. 1B, the customer query may be routed to an agent 'Agent 1' 380 via a digital channel contact center 320.

According to some embodiments of the present disclosure, in a situation where 'Agent 1' is not the agent or an unauthorized/untrained individual, for example, a family member. When 'Agent 1' starts handling the routed query, the agent may answer in a certain manner, using a certain vocabulary and demeanor. The replies, e.g., text responses or transcripts of voice interactions may be analyzed by a ML model, such as the ML textual behavioral identification module 325, and such as ML textual behavioral identification module 150a in FIG. 1A and such as ML textual behavioral identification module 150b in FIG. 1B.

According to some embodiments of the present disclosure, the ML textual behavioral identification module 325 may check if the agent is an unauthorized person 330, by retrieving a profile-identity-data of the agent from a database, such as pattern identification data store 360. The profile-identity-data have been generated and stored in the pattern identification data store 360 during training of the ML textual behavioral identification module 325 by using retrieved textual responses of each agent in one or more historical interactions which were conducted in a controlled environment, as a training dataset, According to some embodiments of the present disclosure, when the result of the analysis doesn't deviate from the agent's regular behavior, it means that the agent is not an unauthorized person, and the results may be saved. When there is an identified deviation from the expected behavior, the system, such as system 100A, in FIG. 1A or system 100B, in FIG. 1B may report it and one or more actions may be taken. For example, after max retries to authenticate have been exhausted 340 the agent and the imposter-probability score may be reported to a user, such as a supervisor 350 in real-time.

According to some embodiments of the present disclosure, another action that may be taken by the system is blocking the agent from further servicing interactions. Yet another action may be asking the agent to authenticate themselves using an authentication application, such as voice biometrics.

According to some embodiments of the present disclosure, in case of deviation of the agent's behavior from the agent's regular behavior, or response pattern, the system such as system 100A, in FIG. 1A or system 100B, in FIG. 1B may allow an additional time for the behavior to align with the expected behavior. This check of deviation of the agent's behavior may be fine-tuned per system or based on the agents' level, to allow more flexibility and reduce false alerts.

According to some embodiments of the present disclosure, alternatively an additional authentication technology may be utilized to work in conjunction with the behavioral examination of the ML textual behavioral identification module 325 to authenticate the identity of the agent or approve the agent's authenticity.

According to some embodiments of the present disclosure, the ML textual behavioral identification module 325 may also be re-trained or enhanced, using interactions that the imposter-probability score for the agent is below a preconfigured threshold on the behavioral identification flow, e.g., high confidence samples.

FIG. 4 schematically illustrates a high-level workflow 400 of agent authentication process, in accordance with some embodiments of the present invention.

According to some embodiments of the present disclosure, when the agents are not in a controlled environment, for example, working from home and did not use any other means for identification, then the currently processed information e.g., textual response may be checked against the agent's stored profile-identity-data.

According to some embodiments of the present disclosure, the agent authentication work-flow may include calculating an imposter-probability score for an interaction of the agent by a ML module, such as ML textual behavioral identification module 450 and such as ML textual behavioral identification module 150a in FIG. 1A or ML textual behavioral identification module 150b in FIG. 1B. The imposter-probability score may be calculated by processing received textual response to a set of textual units. The set of textual units may include vocabulary elements. Each vocabulary element may be an n-gram unit which is a contiguous sequence of '1' through 'n' vocabulary elements from the received textual response.

According to some embodiments of the present disclosure, a distribution of each n-gram may be found 460a-460c, by ML textual behavioral identification module 450. Each vocabulary element may be embedded by using Natural Language Processing (NLP) embedding engine to output a unique vector representation.

According to some embodiments of the present disclosure, each n-gram distribution graph of the '1' through 'n' n-gram distributions may be rearranged by ML textual behavioral identification module 450 and the unique vector representation may be used to create a continues similarity between the textual elements, as shown in detail in FIGS. 6B and 7.

According to some embodiments of the present disclosure, ML textual behavioral identification module 450 may further calculate a distance between past answers and current answer 410, which means calculating an average distance between each vector of the unique vector representation of the profile-identity-data, i.e., past answers and each vector of the unique vector representation of the received textual response, i.e., current answer to yield the imposter-probability score of the interaction that is conducted by the agent.

According to some embodiments of the present disclosure, the calculation of the distance may be operated by Earth Movers Distance (EMD), as shown in FIG. 8. It may be used to reject or accept 420 the agent as the employee agent, i.e., authenticate the agent.

According to some embodiments of the present disclosure, when the agents are in a verified or controlled environment such as the office, hence it is certain that each agent that is having an employment contract with the contact center is the agent that provides the service, then the textual response e.g., data may be stored for the ML textual behavioral identification module 450 enrichment of the profile-identity-data.

According to some embodiments of the present disclosure, every query answer, e.g., textual response, may be processed to a set of textual units such as Uni-Grams, Bi-Grams, . . . N-Grams distribution 460a-460c. The x-axis represents the textual elements and the y-axis represents the number of occurrences of each textual element, for example, as shown by graph 620 in FIG. 6A.

According to some embodiments of the present disclosure, uni-grams is a set of one textual element long out of a sentence with N consecutive textual element. Bi-grams are two textual element long cut out of a sentence of N consecutive textual elements and so on. For example, a sentence such as 'Good things come to those who wait' may be processed into uni-grams, such as [Good], [things], [come], [to], [those] [who] [wait], and also into bi-grams, such as [Good things], [things come], [come to], [to those], [those who], [who wait] and so on till N-grams [Good things come to those who wait].

FIG. 5 schematically illustrates a high-level workflow 500 of personal textual ID creation, in accordance with some embodiments of the present invention.

According to some embodiments of the present disclosure, the ML textual behavioral identification model, such as ML textual behavioral identification module 150a in FIG. 1A and ML textual behavioral identification module 150b in FIG. 1B, may be configured to process the retrieved textual responses of each agent in one or more historical interactions which were conducted in a controlled environment to generate a profile-identity-data, such as agent data 550 for each agent to be used to authenticate identity of the agent.

According to some embodiments of the present disclosure, every response of a new agent may be processed by a system, such as system 100A in FIG. 1A or system 100B in FIG. 1B, such that the textual data may be processed into uni-grams, bi-grams, . . . N-grams 510, by breaking down the text in the agent response into textual units or elements, as shown by graphs 460a-460c. Then, a distribution may be generated or found for each N-Gram and saved for later on usage for creation of a profile-identity-data of the new agent. A response of an existing agent may be used to enrich the profile-identity-data of the existing agent.

According to some embodiments of the present disclosure, each vocabulary may be embedded using a Natural Language Processing NLP embedding engine 520, for example, such as Word2Vec. This process may output a unique numeric vector for each textual element, such as words. In the unique numeric vector for each textual element or words that are similar in meaning may be closer in the vector space. For example, two dots that are close in a two-dimensional space.

According to some embodiments of the present disclosure, each N-Gram distribution may be rearranged 540 using an algorithm, such as Dijkstra algorithm 530, as shown in FIG. 7.

According to some embodiments of the present disclosure, the unique vector representation may be used to create a continues similarity between the textual elements.

According to some embodiments of the present disclosure, to yield an imposter-probability score, an average distance between each vector of the unique vector representation of the profile-identity-data, as in agent data 550 and each vector of the unique vector representation of the received textual response may be calculated.

FIGS. 6A-6B schematically illustrates simulations of agent authentication 600, in accordance with some embodiments of the present invention.

According to some embodiments of the present disclosure, applying a textual response, of the agent such as response 610 to a ML model, such as ML textual behavioral identification module 150a in FIG. 1A or ML textual behavioral identification module 150b in FIG. 1B to authenticate an identity of the agent in real-time by calculating an imposter-probability score for the agent, based on the received textual response 610 and a generated profile-identity-data of the agent.

According to some embodiments of the present disclosure, the received textual response 610 may be processed to a set of textual units. The set of textual units e.g., shown in graph 620 may include vocabulary elements, each vocabulary element of the vocabulary elements may be an n-gram unit which is a contiguous sequence of '1' through 'n' vocabulary elements from the received textual response 610.

According to some embodiments of the present disclosure, a distribution of each n-gram may be found or created.

According to some embodiments of the present disclosure, each vocabulary element may be embedded by using Natural Language Processing (NLP) embedding engine 630 to output a unique vector representation such as graph 640 in FIG. 6B. Then, arranging each n-gram distribution graph of the '1' through 'n' n-gram distributions, as shown in FIG. 7.

According to some embodiments of the present disclosure, the unique vector representation may be used to create a continues similarity between the textual elements. An average distance may be calculated between each vector of the unique vector representation of the profile-identity-data, and each vector of the unique vector representation of the received textual response to yield an imposter-probability score.

FIG. 7 schematically illustrates a simulation of Dijkstra algorithm 700, in accordance with some embodiments of the present invention.

According to some embodiments of the present disclosure, the arranging of each n-gram distribution graph of the '1' through 'n' n-gram distributions e.g., graph 640, shown in FIG. 6B may be operated by Dijkstra algorithm 720 using Euclidian distance.

According to some embodiments of the present disclosure, the Dijkstra algorithm 720 is an algorithm for finding the shortest paths between nodes in a graph, which may represent, for example, road networks. The n-gram distribution graph of the '1' through 'n' n-gram distributions e.g., 620 in FIG. 6A, may be rearranged, such that similar textual elements or words may be closer together 760a-760b.

FIG. 8 is a workflow of Earth Mover's Distance (EMD) process 800, in accordance with some embodiments of the present invention.

According to some embodiments of the present disclosure, to yield an imposter-probability score for an agent for a received response, an average distance may be calculated between each vector of the unique vector representation of the profile-identity-data, which is stored in a database, such as pattern identification data store 130a in FIG. 1A, and each vector of the unique vector representation of the received textual response. The calculation may be operated by an Earth Movers Distance (EMD) algorithm.

According to some embodiments of the present disclosure, EMD algorithm is the minimum cost of changing one distribution into the other, which means comparing between current agent's response distribution and the distribution of profile-identity-data of the agent, where the cost is assumed to be the amount of changes, times the distance by which it is moved. EMD is useful where the distribution has a continuous meaning, for example, when x is a greyscale value from 0 to 255 in an image. The EMD algorithm may be used to find a distance between a new incoming preprocessed agent distribution and a saved one.

According to some embodiments of the present disclosure, textual elements may be rearranged, using their embedding distance and Dijkstra algorithm, as shown in FIG. 7, for calculating the shortest path visiting all nodes in a graph. The path trajectory determines the order of distance values for EMD, thus providing a higher accuracy.

According to some embodiments of the present disclosure, when there is no indication as to the location of the agent, each vocabulary element is an n-gram unit which is a contiguous sequence of '1' through 'n' vocabulary elements from the received textual response 820, such as 460a-460c in FIGS. 4 and 510 in FIG. 5.

According to some embodiments of the present disclosure, when there is an indication as to the identity of the agent, for example, when the agent is working from the office, the processed text response may be used to enrich the agent profile-identity-data in a database, such as pattern identification data store 130a in FIG. 1A.

According to some embodiments of the present disclosure, when there is no indication as to the location of the agent, the EMD algorithm may be used to find the distance between the agent profile-identity-data as stored in the database and a received response.

According to some embodiments of the present disclosure, the distance between each N-gram may be found and may be averaged into a single distance value. Any type of averaging may be used, for example weighted-average, in case there is an additional data and calibration to make the result more accurate.

According to some embodiments of the present disclosure, checking if there is an indication as to the agent location. For example, is the agent in the office 810. When there is no indication as to the agent location, operating a module, such as ML textual behavioral identification module 150a in FIG. 1A or ML textual behavioral identification module 150b in FIG. 1B to authenticate an identity of the agent in real-time by calculating an imposter-probability score for the agent, based on a received textual response and a generated profile-identity-data of the agent. The imposter-probability score indicates a probability that the agent is an imposter.

According to some embodiments of the present disclosure, the imposter-probability score may be calculated by processing a received textual response of the agent, such as 610 in FIG. 6A, to a set of textual units. The set of textual units may include vocabulary elements. Each vocabulary element may be an n-gram unit which is a contiguous sequence of '1' through 'n' vocabulary elements from the received textual response, e.g., as shown in graph 620 in FIG. 6A.

According to some embodiments of the present disclosure, a distribution of each n-gram may be found 820 and each vocabulary element may be embedded by using Natural Language Processing (NLP) embedding engine to output a unique vector representation. Then, each n-gram distribution graph of the '1' through 'n' n-gram distributions may be rearranged in a continues similarity between the textual element that each embedding is represented in the distribution using Dijkstra algorithm.

According to some embodiments of the present disclosure, the unique vector representation may be used to create a continues similarity between the textual elements and an average distance may be calculated 825a-825c between each vector of the unique vector representation of the profile-identity-data, and each vector of the unique vector representation of the received textual response to yield the imposter-probability score 840.

According to some embodiments of the present disclosure, the average distance 840 may be the imposter-probability score 840.

According to some embodiments of the present disclosure, checking if there is an indication as to the agent location. For example, is the agent in the office 810 and when there is an indication as to the agent location, i.e., the agent is in a controlled environment, such as the office, adding the text response to a database and later on retrieving it for processing by creating a set of textual units. The set of textual units may include of vocabulary elements, and each vocabulary element may be an n-gram unit which is a contiguous sequence of '1' through 'n' vocabulary elements from the received textual response.

According to some embodiments of the present disclosure, a distribution of each n-gram may be found 835 and then embedding each vocabulary element may be embedded by using Natural Language Processing (NLP) embedding engine to output a unique vector representation.

According to some embodiments of the present disclosure, each n-gram graph distribution of '1' through 'n' n-gram distributions may be rearranged and the unique vector representation may be used to create a continues similarity between the textual elements 825*a*-825*c*.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for training and applying a Machine Learning (ML) textual behavioral identification model to authenticate an agent, in a digital multi-channel environment, said computerized-method comprising:

training a ML textual behavioral identification model using retrieved textual responses of each agent in one or more historical interactions which were conducted in a controlled environment, as a training dataset, wherein the ML textual behavioral identification model is configured to process the retrieved textual responses of each agent in one or more historical interactions which were conducted in a controlled environment to generate a profile-identity-data for each agent to be used to authenticate identity of the agent, wherein the process of the retrieved textual responses of each agent in one or more historical interactions which were conducted in a controlled environment comprising: (i) creating a set of textual units, wherein the set of textual units is comprised of vocabulary elements, and wherein each vocabulary element of the vocabulary elements is an n-gram unit which is a contiguous sequence of '1' through 'n' vocabulary elements from the received textual response; (ii) finding a distribution of each n-gram; (iii) embedding each vocabulary element using Natural Language Processing (NLP) embedding engine to output a unique vector representation; (iv) arranging each n-gram graph distribution of '1' through 'n' n-gram distributions; and (v) using the unique vector representation to create a continuous similarity between the textual elements, and wherein the arranging of the n-gram distribution is operated by Dijkstra algorithm using Euclidian distance, and wherein the profile-identity-data for each agent is stored in a pattern-identification data store;

receiving a textual response of each agent, when the agent starts an interaction with a customer;

applying the textual response of the agent to the ML textual behavioral identification module to authenticate an identity of the agent in real-time by calculating an imposter-probability score for the agent, based on the received textual response and the generated profile-identity-data of the agent, wherein the imposter-probability score indicates a probability that the agent is an imposter;

sending the imposter-probability score to a file management system to take one or more actions when the imposter-probability score is above a preconfigured threshold.

2. The computerized-method of claim 1, wherein a controlled environment is an environment where an agent is verified and authenticated individually.

3. The computerized-method of claim 1, wherein the one or more historical interactions were conducted via digital text-based channels or voice channels.

4. The computerized-method of claim 1, wherein the retrieved textual responses are text of text-based interactions or transcripts of voice interactions.

5. The computerized-method of claim 3, wherein text-based interactions are processed by at least one of: (i) chat server; and (ii) digital or email channel server.

6. The computerized-method of claim 1, wherein the one or more actions are selected from at least one of: (i) prompting the agent to authenticate; (ii) blocking the agent from handling further interactions; (iii) sending a report or alerts to a supervisor as to the agent imposter-probability score.

7. The computerized-method of claim 6, wherein the prompted authentication is an application for authentication.

8. The computerized-method of claim 7, wherein the prompted authentication is voice-biometric.

9. The computerized-method of claim 1, wherein the imposter-probability score is calculated by: (i) processing the received textual response to a set of textual units, wherein the set of textual units is comprised of vocabulary elements, wherein each vocabulary element of the vocabulary elements is an n-gram unit which is a contiguous sequence of '1' through 'n' vocabulary elements from the received textual response; (ii) finding a distribution of each n-gram; (iii) embedding each vocabulary element by using Natural Language Processing (NLP) embedding engine to output a unique vector representation (iv) arranging each n-gram distribution graph of the '1' through 'n' n-gram distributions; (v) using the unique vector representation to create a continuous similarity between the textual elements; (vi) calculating an average distance between each vector of the unique vector representation of the profile-identity-data, and each vector of the unique vector representation of the received textual response to yield an imposter-probability score.

10. The computerized-method of claim 9, wherein the calculating of the average distance is operated by an Earth Movers Distance (EMD) algorithm.

11. The computerized-method of claim 1, wherein when the imposter-probability score is below a preconfigured threshold it indicates that the agent is authenticated and the received textual response is used for retraining or enriching the ML textual behavioral identification module.

12. The computerized-method of claim 1, wherein every preconfigured time the ML textual behavioral identification model is retrained or enriched by a textual response of each agent during an interaction which has been conducted in a controlled environment, wherein the agent has been authenticated during the interaction by an authentication application.

13. A computerized-system for training and applying a Machine Learning (ML) textual behavioral identification model to authenticate an agent, in a digital multi-channel environment, said computerized-system comprising:
one or more processors; and
a pattern-identification data store;
said one or more processors are configured to:
train a ML textual behavioral identification model using retrieved textual responses of each agent in one or more historical interactions which were conducted in a controlled environment, as a training dataset,
wherein the ML textual behavioral identification model is configured to process the retrieved textual responses of each agent in one or more historical interactions which were conducted in a controlled environment to generate a profile-identity-data for each agent to be used to authenticate identity of the agent,
wherein the process of the retrieved textual responses of each agent in one or more historical interactions which were conducted in a controlled environment comprising: (i) creating a set of textual units, wherein the set of textual units is comprised of vocabulary elements, and wherein each vocabulary element of the vocabulary elements is an n-gram unit which is a contiguous sequence of '1' through 'n' vocabulary elements from the received textual response; (ii) finding a distribution of each n-gram; (iii) embedding each vocabulary element using Natural Language Processing (NLP) embedding engine to output a unique vector representation; (iv) arranging each n-gram graph distribution of '1' through 'n' n-gram distributions; and (v) using the unique vector representation to create a continuous similarity between the textual elements, and wherein the arranging of the n-gram distribution is operated by Dijkstra algorithm using Euclidian distance, and wherein the profile-identity-data for each agent is stored in the pattern-identification data store;
receive a textual response of each agent when the agent starts an interaction with a customer and forward the textual response to the ML textual behavioral identification module;
the ML textual behavioral identification module is configured to apply the textual response of the agent to authenticate an identity of agent in real-time by calculating an imposter-probability score for the agent, based on the received textual response and the generated profile-identity-data of the agent that is stored in the pattern-identification data store, and forward the imposter-probability score to a file management system;
wherein the imposter-probability score indicates a probability that the agent is an imposter, and wherein one or more processors in
said file management system are configured to take one or more actions when the imposter-probability score is above a preconfigured threshold.

14. The computerized-system of claim 13, wherein the file management system is further configured to detect aged training data of an agent for disposal and communicate with the ML textual behavioral identification module to retrain based on recent data of the agent.

* * * * *